Dec. 8, 1964 R. W. ALARIE 3,160,588
FILTER APPARATUS AND CONNECTING MEANS THEREFOR
Filed April 14, 1961 4 Sheets-Sheet 1

INVENTOR
Robert W. Alarie
BY John A. Mawhinney
ATTORNEY

Dec. 8, 1964 R. W. ALARIE 3,160,588
FILTER APPARATUS AND CONNECTING MEANS THEREFOR
Filed April 14, 1961 4 Sheets-Sheet 2
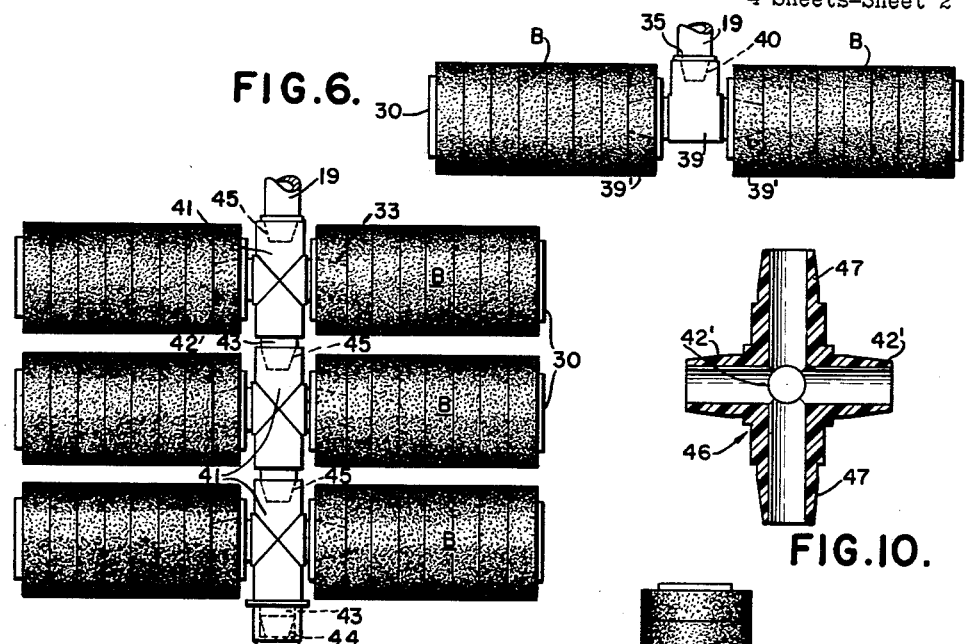
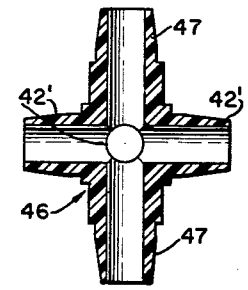
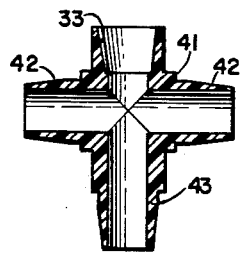
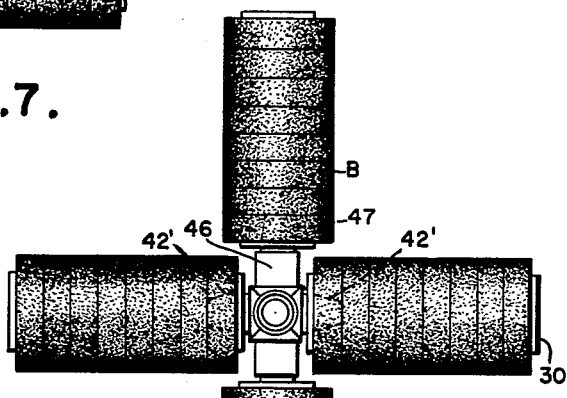
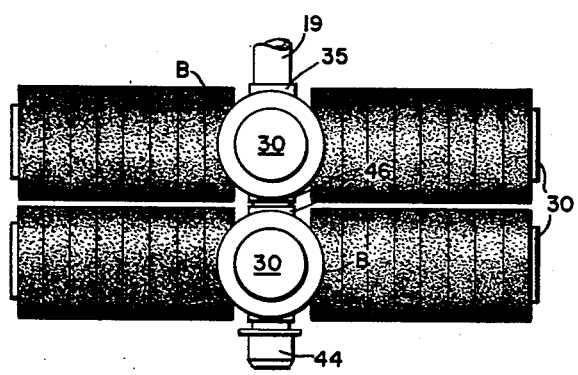
INVENTOR
Robert W. Alarie
BY John A. Mawhinney
ATTORNEY Dec. 8, 1964 R. W. ALARIE 3,160,588
FILTER APPARATUS AND CONNECTING MEANS THEREFOR
Filed April 14, 1961 4 Sheets-Sheet 3

INVENTOR
Robert W. Alarie

BY John A. MacKinney
ATTORNEY

Dec. 8, 1964  R. W. ALARIE  3,160,588
FILTER APPARATUS AND CONNECTING MEANS THEREFOR
Filed April 14, 1961  4 Sheets-Sheet 4

INVENTOR
Robert W. Alarie
BY John A. Mawhinney
ATTORNEY

United States Patent Office 3,160,588
Patented Dec. 8, 1964

3,160,588
FILTER APPARATUS AND CONNECTING MEANS THEREFOR
Robert W. Alarie, 55 Victor Ave., Johnston, R.I.
Filed Apr. 14, 1961, Ser. No. 103,036
4 Claims. (Cl. 210—457)

This invention relates to a novel apparatus, especially useful in the plating industry for the filtering of plating solutions, which is inexpensive, efficient, portable and practically maintenance-free, rapid and simple in operation.

An important object is to provide a structure wherein the parts contacted by plating solution are corrosion resistant in order to attain the ends in view.

A second object is to provide a construction wherein the number of necessary connections of the parts is greatly reduced to thereby eliminate potential leakage points.

A third object is to provide an apparatus which avoids employment of a filter chamber in which the solution is cleaned or filtered so as to eliminate much of the waste of costly solutions as in existing apparatus; wherein the chance of waste is greatly reduced, and in which the apparatus centers around a basic unit which is self-priming and operable in practically any position.

A fourth object is to provide such a construction wherein the employment of separable and minor parts or devices such as nuts, bolts, screws, covers, valves and the like which contribute to troublesome operation, are either obviated or reduced to the minimum.

Still further an object is to provide a filter assembly enabling filter cartridges to be reloaded without deleterious hand contact therewith.

Various additional objects and advantages will be pointed out if not actually apparent, from a consideration of the description following, taken in connection with one operative embodiment shown in accompanying drawings wherein—

FIG. 6 is a side elevation of the parts of FIG. 5;

FIG. 7 is a view in side elevation showing a multiplicity of filter cartridges connected by cross adapters, one of which in turn is attachable to the pump suction pipe or line and wherein the cartridges are mounted in vertical rows;

FIG. 8 is a central longitudinal section through the adapter used in the assembly of FIG. 7;

FIG. 9 is a plan view of a four-way cross adapter arrangement;

FIG. 10 is a central longitudinal section taken through the adapter used in FIG. 9;

FIG. 11 is a side elevation of the parts of FIG. 9;

Figure 1:
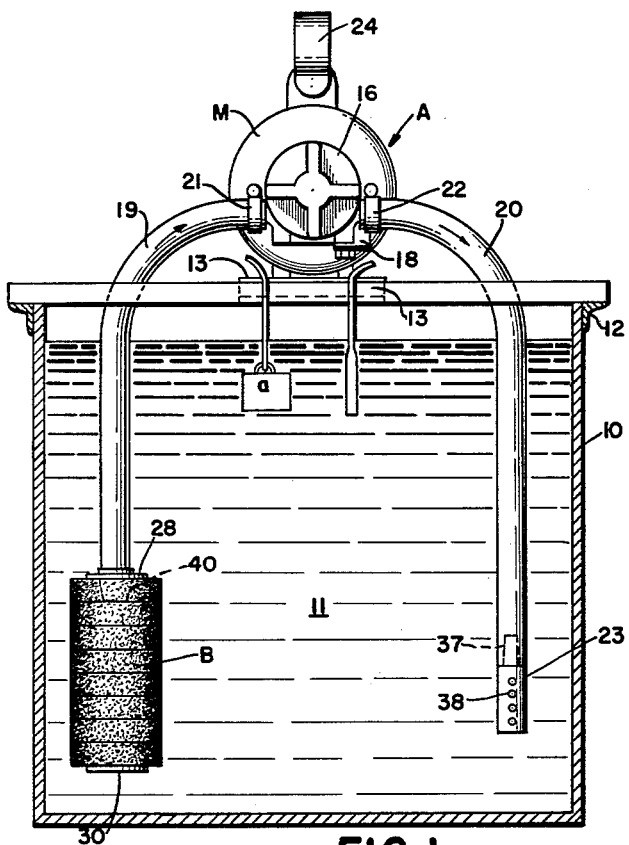
FIG. 1 is a vertical sectional view taken through a conventional tank or reservoir containing a plating solution; operatively showing in connection therewith and in elevation, plating apparatus or equipment in accordance with the invention.

Referring specifically to the drawing wherein like reference characters designate like or similar parts, a tank or reservoir 10 of suitable size and shape contains a plating solution in which articles *a* to be plated are suitably suspended or immersed, the tank being conventional and usually the anode. The improved filtering unit or apparatus as a whole in the first form of the invention (FIGS. 1 and 2) is designated A, the same being portable so as to be readily located or supported for use not only in the tank suggested at 10, but in any desired tank or reservoir or succession thereof. Such apparatus employs a suitable motor M which is supported, for example, on a shelf 12 rigid with the upper edge of a wall of the tank 10. The motor M has a base 13 equipped at the bottom with a rubber or other vibration-absorbing resilient pad 14 (FIG. 2) which directly engages the shelf, or other support 12, and on which the motor is removably or detachably connected in any appropriate manner.

From the main shaft 15 of motor M, the impeller of a pump 16 is appropriately driven, the casings of said pump and motor being appropriately connected together as by a suitable torque arm or bracket.

Said pump has a suction line of a rigid pipe or flexible hose 19, and at its outlet has a discharge line 20 of similar material, such conduits 19 and 20 being appropriately clamped in a leak-proof manner at 21 and 22, respectively, at the inlet and outlet of said pump 16.

Said lines 19 and 20 are made of a suitable plastic or other material which withstands corrosion or deleterious action from the plating solution passing therethrough. Likewise the pump 16 is also made of parts which will withstand corrosion or deleterious action from the plating solution passing therethrough, and thus as far as practical of suitable plastic or other material and like lines 19 and 20 are built lined to withstand corrosion or deleterious action through said passage.

The suction hose or line 19 at its lower or inlet end carries one or more removable and renewable filter cartridges B for submersion in the solution 11 to suck the plating solution therethrough upon operation of the pump 16, the plating solution passing upwardly through the hose or line 19, through the pump and thence discharging or returning to the plating solution 11 from hose or line 20 through a diffuser 23.

The apparatus as a unit or whole is readily mountable and removable from the shelf 12 or other appropriate support, a suitable handle 24 being provided as at the top of the casing or motor M to facilitate handling.

Reverting to the filter cartridge B, the same employs a tubular core 25 with a multiplicity of perforations 26 therethrough. Removably strung on said tube (and without the use of objectionable screw means) are one or more porous annular disks or pads 27 of any appropriate filtering material for the particular solution 11 employed. For instance, such filtering disks or pads 27 may be of felt, cotton, glass, Dacron, dynel, Orlon, nylon or equivalents or any combination material or their equivalents.

Figure 3:
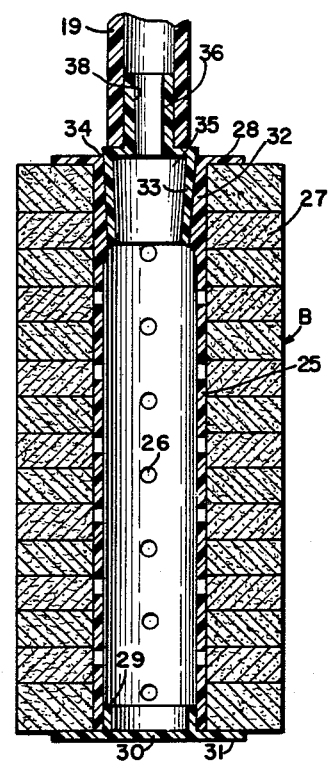
FIG. 3 is a longitudinal sectional view on an enlarged scale showing the filter cartridge and one means of connection to the pump suction line.

Said tubular core 25 at one end has a laterally extending flange 28 which overlaps or is abutted by a side face of the uppermost filtering disk 27, and at the other end of the cartridge a disk-retaining closure cap 30 is employed, the same having a collar 29 extending into and removably bonded in the bore of core 25 and a laterally extending flange 31 in overlapping relation to a side face of the lowermost filter disk 27. Said tubular core adjacent the flange 28 and within its bore is provided with an enlargement 32 producing a reinforced conical seating surface 33 lying in the surface of an imaginary cone whose base is at the flange 28 and whose apex is interiorly of the cartridge B. Said seat 33 is engageable by and is detachably bonded to a correspondingly shaped exterior conical surface 34 of a portion of a hollow nipple or connector 35 having a reduced end or stem 36 firmly cemented to the lower or inlet end of the line or hose 19, as best shown in FIG. 3. Tubular core 25, cap 30, and nipple or connector 35 are constructed of preferably rigid parts enabling the plating solution to pass through same, with minimum corrosion or deleterious action; and for instance are made of the same material as the lines or hose 19 and 20, that is, of a suitable plastic. In addition, where desired in order to form more effective and leak-proof connections, the cap 30 and nipple or connection are bonded to the tubular core and seat 33, respectively.

Reverting to the diffuser 23, it may be a hollow body preferably closed at its distal end and have a reduced stem 37 at its other end telescoped into the discharge line or hose 20. Such diffuser is removably bonded to hose 20 and is replaceable, being porous in that it has a multiplicity of openings 38 as best shown in FIG. 1. The material from which the diffuser is made avoids corrosion or deleterious action from the plating solution passing therethrough and is usually of plastic or other material like the lines or hoses 19 and 20, core 25, closure cap 30 and nipple 35.

Various changes may be resorted to, provided they fall within the spirit and scope of the invention, and that the invention is not limited to the employment of a single filter cartridge unit B but includes adapter means whereby units B are capable of use in pluralities and in different ways as exemplified by FIGS. 4 to 11 and 21 as will be more specifically explained.

Figures 2, 4, 5:
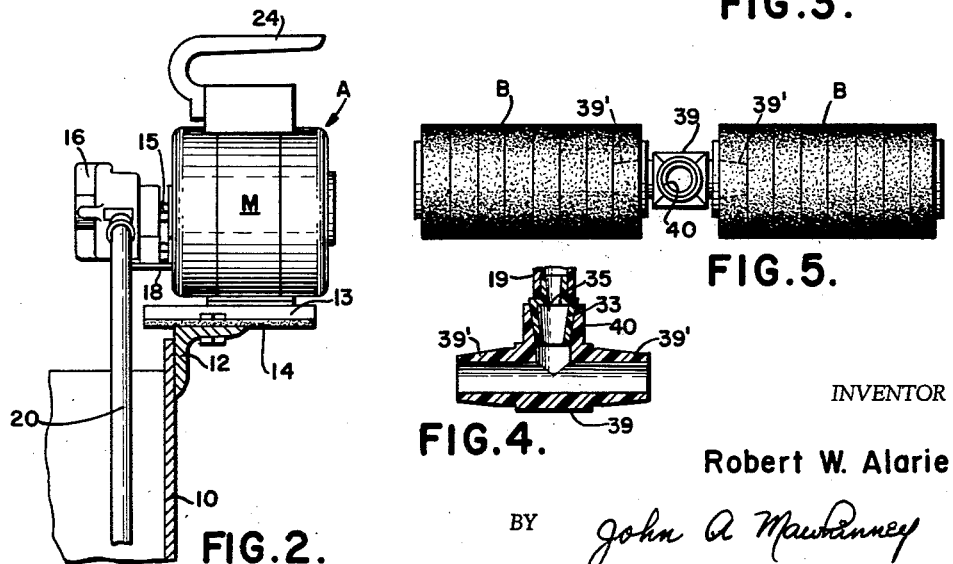
FIG. 2 is a view showing a portion of the apparatus or equipment in a position at right-angles to FIG. 1.
FIG. 4 is a central sectional view through a T adapter.
FIG. 5 is a plan view showing a pair of the filter cartridges connected by said T adapter of FIG. 4 which in turn is attachable to the pump suction line or pipe.
Figure 13:
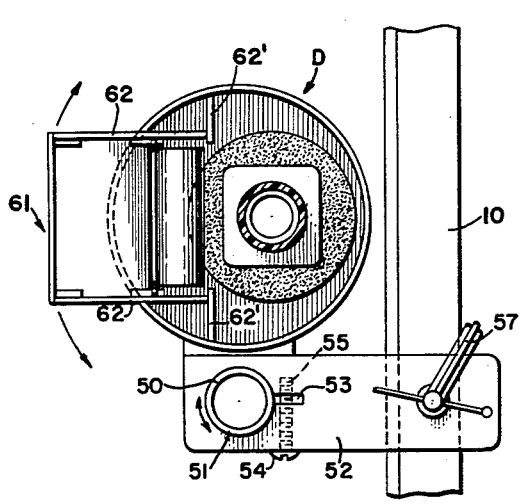
FIG. 13 is a view primarily in plan showing the skimmer and said diffuser means.
Figure 14:
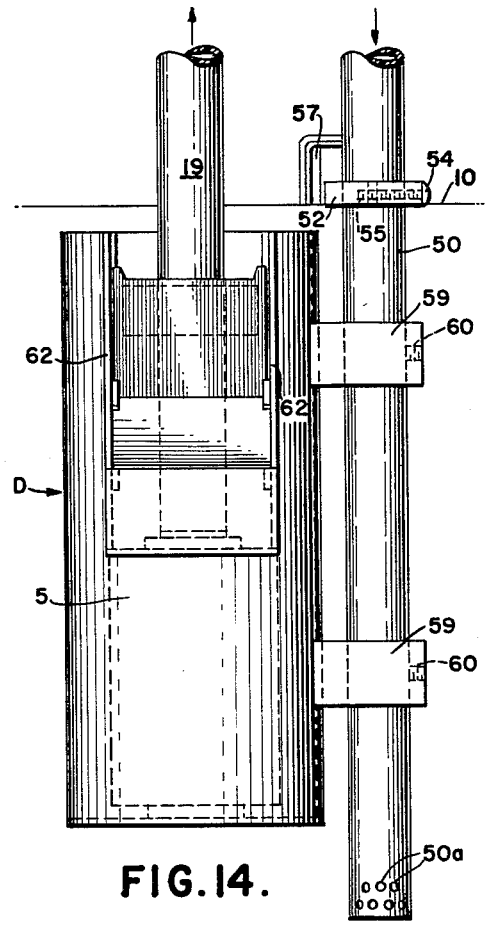
FIG. 14 is a side view of the said skimmer and diffuser means.

Considering the form of FIGS. 4, 5 and 6, a pair of the cartridges B are connected in horizontal alignment by a hollow adapter 39 closed at its bottom but open at the top to line 19 and at both sides detachably bonded at conical surfaces 39' to the conical surfaces 33 of filter cartridges B. The adapter 39 has an interior conical seat 40 corresponding to the seat 33, so as to fit the conical surface of the nipple 35.

In the variation of FIG. 7, any suitable number of rows of the cartridges B may be employed, three rows being shown for example, with each row consisting of two of the cartridges. To accomplish this result, adapters 41 are used, each adapter being hollow and of cruciform shape in order to permit passage of the plating solution from the cartridges B into the adapters, thence through the adapters where necessary, and thence to the hose 19. Each adapter includes a conical projection 42 whereby it appropriately engages the conical seat 33 of the associated cartridge B. In addition, each adapter 41 has a depending conical projection 43, a cap 44 being employed to close the lowermost conical projection 43, the other projections 43 fitting conical seats 45 in the two lowermost adapters 41, and the uppermost adapter also having a conical seat 45 which fits the nipple 35 like the seat 33. The adapters are thickened or reinforced at the seats 45 comparable to the reinforced portion 32 in FIG. 3.

In FIGS. 9, 10 and 11, another variation is disclosed wherein the cartridges B may be employed in any suitable number of vertical rows, the adapters 46 (FIG. 10) here employed differing only from those designated 41 in FIG. 8 in that two additional conical seating projections 47 are formed thereon, the other projections 42' being of the same construction as the projections 42 to co-act with the adjacent seats 33 of the cartridges B in the same manner.

The various adapters of the modified forms employed in FIGS. 4 to 11, that is the adapters 39, 41 and 46 are constructed of the same material as the core 25, closure cap 30, nipple 35, pipes or hose 19 and 20, and for the same reason, and wherever there is surface contact such parts may be suitably plasticly but separably bonded together.

Coming now to the construction of FIGS. 12 to 15, a vertical conduit 50 of the same materials and structure as discharge line 20 is clamped in an opening 51 of a bracket 52. The latter is split at 53 away from the opening to provide gripping portions which are tightened around the pipe by a screw 54 extending loosely into the bracket and beyond the split 53 screw-threaded at 55 thereto. Pipe 50 may thus be adjustably fastened in any position about its axis and the bracket 52 may be secured at any angle to the wall of tank 10 by a clamp 57. Such pipe 50 is closed at its lower end, and has ports or orifices $50^a$ near its base. This pipe 50 thus supplants and functions like conduit 20, said ports or orifices $50^a$ functioning to diffuse the discharging plating solution like the ports 38. It will especially be noted that the parts 50–56 are so adjustable vertically and angularly as to effect discharge of the plating solution through the ports $50^a$ to cause a current of travel thereof, as suggested at c in FIG. 12, and in a path leading to the inlet of a skimming means D which removes undesired or deleterious matter from the upper layer of the solution during its circulation in the tank as will hereinafter be more specifically described. While the discharge into the tank may take place solely through conduit 50, and without skimming of the solution at all, yet in some instances it is preferable to skim such solution by using the said means D. When skimmer D is employed, pipe 50 is not used as a discharge line for the plating solution, but is used merely as a support for the skimmer means D with the solution discharging into the body 11 through the line 20 and its diffuser 23. Skimmer means D includes a container or the like 58 which may be round, rectangular or of any other desired cross-section. Suction line 19 with the filter assembly B mounted thereon and immersed in the plating solution as in FIGS. 13, 14 and 15 depends into said container 58.

Said container 58 is adjustable vertically and angularly on a vertical axis on and about pipe 50 as by means of clamps 59 surrounding said pipe 50 and coacting binding screw members 60. The upper portion of container 58 is cut away at an inlet 61 at the sides of which are parallel spaced vertical walls 62 attached at their base edges and sides to the adjacent edges of the main wall of container 58, otherwise being unconnected.

A weir means which is variable as to height according to the level of the plating solution and located in said inlet 61 regulates the skimming action. Such weir comprises a plurality of plates 63 and 64, the former being pivoted on horizontal axes at 65 to walls 62, and both of them being horizontally pivoted together as at 66, the plate 64 being sustained in vertical position by a float 67 which follows the level 68 of the plating solution in container 58 with the upper edge of plate 64 being the weir edge proper over which the plating solution flows into the container 58, the level of the latter being suggested at 69 in FIG. 15. The joints at pivots 65 and 66 and at the sides of the plates 63 and 64 are sufficiently tight to avoid leakage to an extent which would seriously affect the skimming operation. Said walls 62 may be reinforced by narrow angular walls 62' fastened to their inner edges and also to the main wall of the container.

Figure 17:
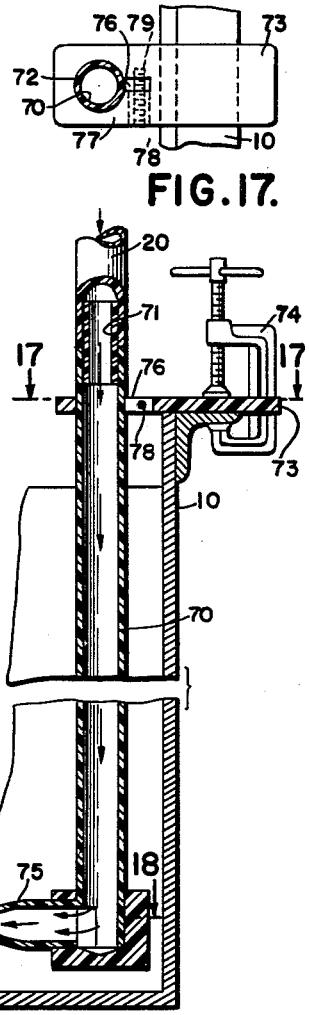
FIG. 17 is a cross-section taken on the line 17—17 of FIG. 16.
Figure 16:
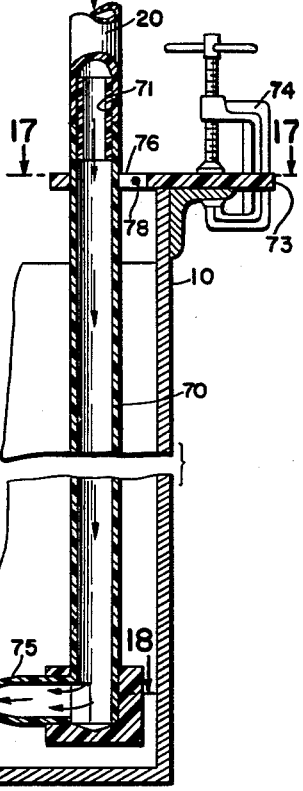
FIG. 16 is a view primarily in vertical section suggesting a modified form of diffuser means together with its mounting in the tank.
Figures 18, 20:
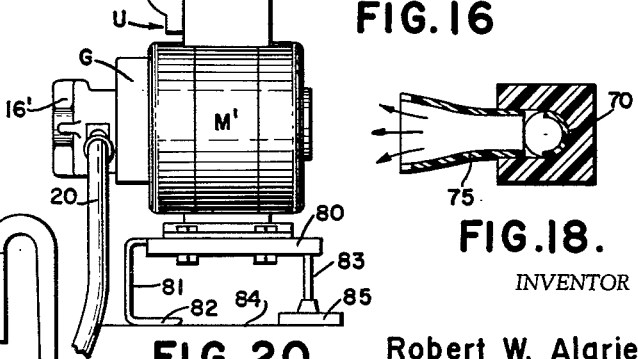
FIG. 18 is a cross-section taken on the line 18—18 of FIG. 16.
FIG. 20 is a side elevation of the motor and pump assembly of FIG. 19 supported in horizontal position.

The pipe 50 as well as skimmer D may be omitted and in its stead a discharge pipe or conduit 70 used, as shown in FIGS. 16, 17 and 18, in which event pipe 70 by means of a coupling 71 is removably or permanently connected in continuous relation with the pipe 20. Such discharge pipe 20 is mounted in a hole 72 of an attaching bracket 73 suitably clamped at any angle by means 74 to the upper edge of one of the vertical walls of tank 10. Said pipe 70 at its lower end has a nozzle 75 suitably widened, flared, or otherwise shaped at its outlet to diffuse the plating solution into the main body thereof in the same manner as the diffuser at 38 and 50ª. Further, tube 70 is capable of fastening in the opening 72 at any angle about a vertical axis to control or direct the path or current of the diffused plating solution toward the filter cartridges B and/or skimmer D toward the parts being plated to agitate and remove spent solution, as in the path suggested at c in FIG. 12. To this end, bracket 73 is slit or slotted from the hole 72 at 76, and has an opening 77 through which the shank of a screw 78 loosely passes, and which shank bridges the slot 76 and beyond the same at 79 is in screw-threaded engagement with the bracket whereby tightening of the nut 78 will contract or bind the bracket at the wall of opening 72 against the tube 70, and thus secure it at any adjusted angle, thus being similar to the fastening of tube 50 in bracket 52.

Figure 19:
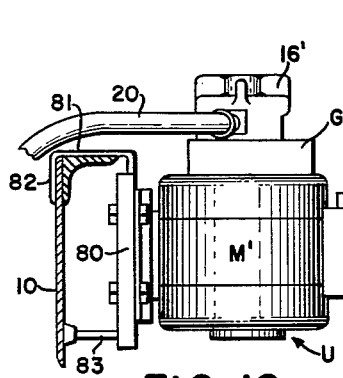
FIG. 19 is a side elevation showing a modified form of motor and pump assembly hooked to a side wall of the tank.

In connection with any of the forms of the invention described, the pump and motor unit U of FIGS. 19 and 20 may be used in lieu of the pump and motor unit M-16 and associated parts of the first form of the invention. Referring more specifically to this form of motor and pump unit U, an electric motor is generally shown at M' and a pump at 16', corresponding to motor and pump M and 16, but with the unit additionally including reduction gearing at G interposed between motor M' and the pump 16', to enable slowing down the speed of the pump for instance to approximately one-half the motor speed. This reduces the velocity of flow through the pump 16' and prevents a drop to the absolute pressure when the filter cartridge B or equivalent becomes unduly dirty since such drop in pressure tends to admit objectionable vapor bubbles into the solution.

Figure 15:
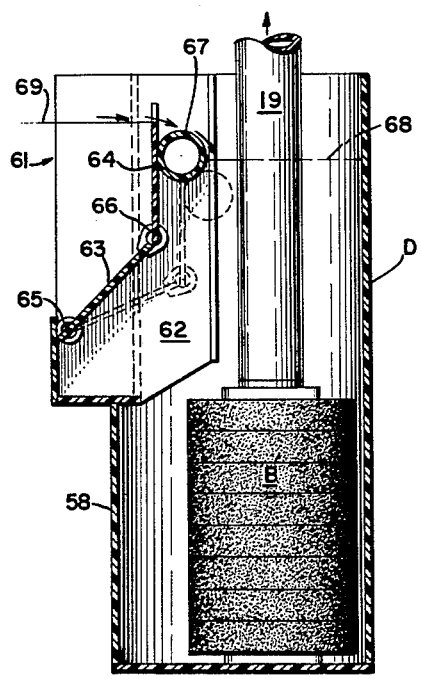
FIG. 15 is a view primarily in vertical section taken through the skimmer means on the line 15—15 of FIG. 14.
Figure 12:
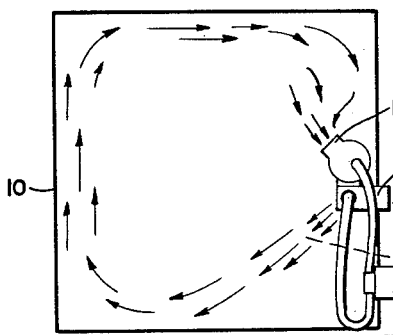
FIG. 12 is a diagrammatic plan view of a second or modified form of the invention wherein skimming means is employed, being shown in connection with a tank, and suggesting the path taken by the plating solution in the skimming thereof.

In the use of the apparatus when it employs the skimmer D, the flow weir 63-64 compensates for the drop in liquid level from that in the tank at 69 to that in the container 58 at 68 (FIG. 15). The skimmer D is adjustable vertically to the proper height so that the plate 64 acts as a weir, and in addition the skimmer is angularly adjustable about a vertical axis by the means 59-60 to take advantage of the best path of flow in the tank as suggested at c. The velocity flow over the weir plate 64 and into the container 58 skims the top or surface of the solution in the tank, and the container 58 is removable or capable in any manner of being emptied of skimmed material from time to time.

Said unit U may be mounted in vertical position (FIG. 19) or in horizontal position (FIG. 20). This unit has a base 80 from one end of which a hook-shaped resilient vibration-absorbing supporting bracket 81 extends, the same having an angular portion 82 to overlap and hang on the upper edge portion of the tank 10 (FIG. 19). Angular portion 82 extends toward legs 83 located at the opposite end of the base 80 to abut the exterior surface of the same side wall of tank 10.

When motor-pump U is used in the horizontal position as in FIG. 20, the hook bracket 81 rests upon a horizontal support as suggested at 84 and the unit is levelled by a block or the like 85 on the support beneath legs 83.

Figure 21:
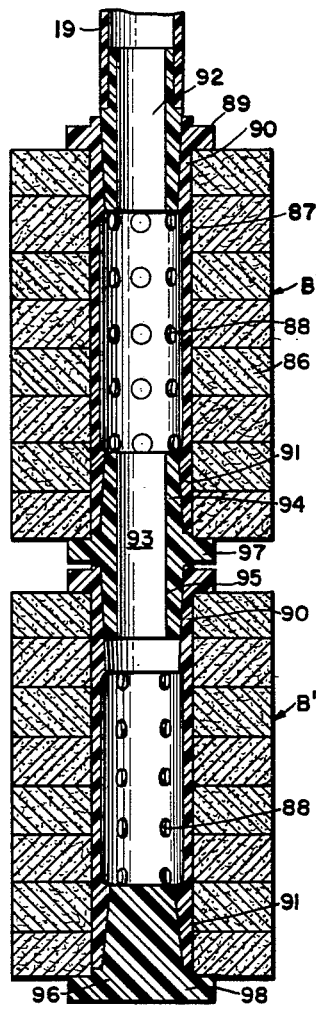
FIG. 21 is a vertical sectional view showing use of a pair of filtering elements arranged in vertical alignment.

In FIG. 21 a construction is suggested whereby the filter cartridges here designated B', which are in the main construction like those at B, may be used in vertically aligned pluralities. To this end, the disks or pads 86 which are of the same material as those disclosed at 27 are threaded upon cores 87 of the same material as those at 25, and perforated at 88. Each core 87 has an abutment flange 89 at one end for the same purpose as that at 28, and at the other end each core is usually free. The walls of the cores 87 at each end are thickened and inwardly tapered as at 90 and 91, the tapers being in opposite directions. The taper or seat 90 is engaged by a connector or nipple 92, substantially similar to that employed at 35, either detachably or permanently bonded to the suction conduit 19. Connecting the filter units B' is a hollow nipple or connector generally designated 93 having oppositely tapered ends 94 and 95 respectively, removably engaged with or bonded to the tapered seat 91 of the uppermost filter cartridge B' and with the tapered seat 90 of the lowermost cartridge B'. The tapered seat 91 of the lowermost cartridge B' is closed by means of a detachable plug 96 provided with a tapered portion removably bonded to the seat 91. The nipple 93 and plug 96 at 97 and 98, respectively, have lateral projecting flanges removably retaining the disks or pads 86 on the cores 87.

Figure 22:
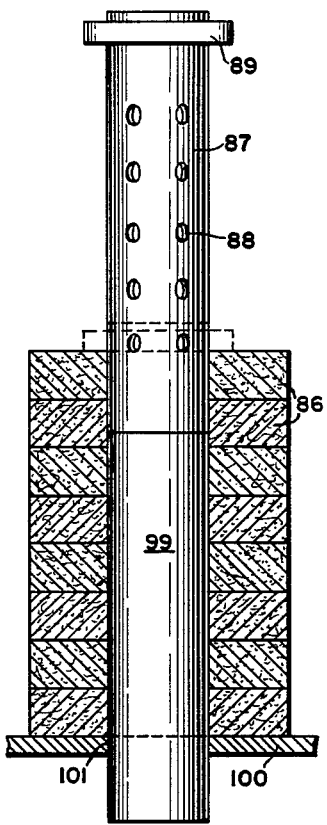
FIG. 22 is a view partly in vertical section and partly in elevation suggesting the threading of filter elements onto the core of the filter cartridge.

The filter disks 27 or 30 are supplied in a group conveniently threaded on a temporary and discardable core 99 (FIG. 22) of any desired material. Such pads or disks are transferred to the core 25 or 87 as suggested in FIG. 22 by aligning the core 87 with core 99 when supported as at 100, and then pushing the core 87 through an opening 101 in the support and the openings of the assembly of disks or pads to displace the core 99 and take its place. In this way the hands of the operator which are usually soiled with grease or other contaminating matter apt to clog the pores of the disks or pads do not contact the pads or disks.

The parts of FIGS. 12 through 22, like those of the other figures, for the most part, are capable of expeditious and comparatively inexpensive manufacture from a plastic as well as from any suitable material. The use of plastic, and particularly a transparent plastic, is especially advantagous in that those portions of the conduits 19, 20, and tube 70, which extend above the level of the plating solution in the tank 10, really serve like sight gauges to enable the operator to observe the turbidity and condition generally of the plating solution flowing therethrough.

What is claimed is:

1. A filter cartridge structure comprising a plurality of filter cartridges each comprising a permanent substantially rigid elongated liquid pervious tubular core having a chamber therein extending throughout the axial length of the core and provided with axially spaced apart and angularly disposed openings communicating with the chamber, said core having at one end thereof an annular flange extending outwardly beyond the core, a plurality of filter bodies of disk-shape each having a substantially centrally disposed opening therein having a diameter substantially equal to the outside diameter of the core, said filter bodies being threaded on to the core with the wall of the opening of each body in direct contact with the outer surface of the core and with the initial body engaging the flange to prevent escape of the bodies from the core from the said one end thereof, a cap mounted on the other end of the core having a flange overlying and engaging the last filter body to prevent escape of the bodies from said other end of the core, hollow coupling means for connecting the core of at least one of said cartridges directly to an outlet conduit for communicating the core chamber with the outlet conduit so that the conduit will constitute the sole means for supporting said filter cartridge in the medium to be filtered, said hollow coupling means comprising a conically tapered portion wedgingly held in the core adjacent the annular flange thereon and a cylindrical portion coaxial with said conically tapered portion for connection to the outlet conduit.

2. A filter cartridge structure as claimed in claim 1 wherein a hollow means is connected to said coupling means establishing communication between said coupling means and the cores of a number of filter cartridges.

3. A filter cartridge structure as claimed in claim 1 wherein a hollow T adapter means is connected to said coupling means and establishes communication between the core of a number of filter cartridges.

4. A filter cartridge structure as claimed in claim 1 wherein a hollow means is connected to said coupling means differently angularly positioning and establishing communication between the cores of a plurality of filter cartridges.

References Cited by the Examiner
UNITED STATES PATENTS

| | | | |
|---|---|---|---|
| 1,107,391 | 8/14 | Welch | 210—242 |
| 1,881,913 | 10/32 | Parker | 285—332 |
| 2,055,070 | 9/36 | Ericksson | 204—238 |
| 2,325,169 | 7/43 | Alsop | 210—416 X |
| 2,347,469 | 4/44 | Dies | 285—332 |
| 2,366,010 | 12/44 | Dies | 285—332 |
| 2,487,399 | 11/49 | Thurber | 204—272 |
| 2,548,400 | 4/51 | Shepard | 210—345 X |
| 2,602,548 | 7/52 | Griffiths | 210—460 X |
| 2,667,270 | 1/54 | Cady et al. | 210—196 |
| 2,767,851 | 10/56 | Muller | 210—488 X |
| 2,788,125 | 4/57 | Webb | 210—460 X |
| 2,846,075 | 8/58 | Thomas | 210—457 |
| 2,903,136 | 9/59 | Buckman | 210—492 X |
| 2,905,326 | 9/59 | Judson et al. | 210—457 |
| 2,913,117 | 11/59 | Gould | 210—242 |
| 3,036,712 | 5/62 | Barbara | 210—169 |
| 3,092,577 | 6/63 | Sather | 210—488 X |

FOREIGN PATENTS

| | | |
|---|---|---|
| 544,306 | 6/56 | Italy. |
| 1,032,824 | 4/53 | France. |

HARRY B. THORNTON, *Primary Examiner.*

HERBERT L. MARTIN, *Examiner.*